Oct. 17, 1967     K. STEISSLINGER     3,347,142

FILM MAGAZINE AND CAMERA FOR USE THEREWITH

Original Filed Aug. 24, 1964     5 Sheets-Sheet 1

KURT STEISSLINGER
INVENTOR.

BY
ATTORNEYS

Oct. 17, 1967  K. STEISSLINGER  3,347,142
FILM MAGAZINE AND CAMERA FOR USE THEREWITH
Original Filed Aug. 24, 1964  5 Sheets-Sheet 3

KURT STEISSLINGER
INVENTOR.

BY R. Frank Smith
Malcolm J. Dunn
ATTORNEYS

Oct. 17, 1967 K. STEISSLINGER 3,347,142
FILM MAGAZINE AND CAMERA FOR USE THEREWITH
Original Filed Aug. 24, 1964 5 Sheets-Sheet 5

KURT STEISSLINGER
INVENTOR.

BY R. Frank Smith
Malcolm G. Dunn
ATTORNEYS 3,347,142
FILM MAGAZINE AND CAMERA FOR
USE THEREWITH
Kurt Steisslinger, Stuttgart-Hedelfingen, Germany, assignor to Eastman Kodak Company, Rochester, N.Y., a corporation of New Jersey
Continuation of abandoned application Ser. No. 391,370, Aug. 24, 1964. This application Sept. 10, 1965, Ser. No. 486,337
Claims priority, application Germany, Aug. 24, 1963, K 50,634
15 Claims. (Cl. 95—31)

ABSTRACT OF THE DISCLOSURE

An enclosed film magazine which has an exposure opening in its front wall through which the film is exposed as it is advanced therepast when the magazine is in a camera, has a rear wall which defines in alignment with such exposure opening, opening means through which is received for engagement with the film the camera pressure plate means for establishing the focal plane; and a camera having such pressure plate means that will extend into a film magazine through the magazine rear wall opening means for engagement with the film.

Cross-references to related applications

Reference is made to commonly assigned U.S. Patent No. 3,138,081, entitled "Roll Film Magazine," issued June 23, 1964 in the name of Hubert Nerwin; and commonly assigned U.S. Patent No. 3,138,084, entitled "Roll Film Magazine and Camera Adapted to Use Same," issued June 23, 1964 in the name of Douglass C. Harvey.

The invention relates to a film magazine with preloaded film for insertion into a camera, comprising a film supply chamber and a film chamber for receiving the exposed film, said chambers being connected by a wall member. This application is a continuation of U.S. application Ser. No. 391,370, filed Aug. 24, 1964, now abandoned, and claims priority based on German patent application K–50,634 IXa/57a, filed Aug. 24, 1963.

In most cameras allowing an exchange of the film in daylight, a film is used that is wound upon a spool, said film being protected against light either by a strip of light-tight material, in particular a light-tight strip of backing paper, or by a light-tight cassette housing the spool and the film. If one of these two types of film is to be inserted into such a camera, it is necessary to fasten the end of the film to the core of a take-up spool of the camera. Inserting the film in this manner however requires a manual skill, and it has become evident that most of the failures are due to a lack of skill in this respect. Even if the insertion was done correctly, it still is rather time-consuming and complicated.

After such a film has been exposed in the camera, another operation becomes necessary before the film can be sent away for developing. This operation comprises the fixing of the end of the paper backing projecting over the film to the roll on the one hand, and the rewinding of the exposed film into its cassette on the other hand.

Another disadvantage has to be seen in the fact that with the usual roll films of whatever type—if it is not completely exposed—the film cannot be exchanged without the unexposed portion being wasted. This may happen, for instance, when the photographer desires to exchange a partially exposed black-and-white film for a color film. With some cameras the partially exposed film can be rewound into its cassette, thereafter removed from the camera in daylight and reinserted later; after the reinsertion it is necessary, however, to wind the exposed film portion onto the take-up spool of the camera before taking the next picture. This procedure is, of course, rather cumbersome, the more so since frequently double exposures occur, or parts of the film are not exposed, depending on how far the film is rewound after its second insertion. With cameras using a film with paper backing such a procedure is still more impractical since it becomes necessary either to exchange the film in the dark or to wind the film in the dark from the take-up spool to the supply spool after the spools were removed from the camera.

As has been realized after the rool film appeared on the market, these and other disadvantages can be fully or partially overcome in that the film is placed into a supply chamber of a film magazine or cartridge where it is fed in accordance with the effected exposures past an exposure aperture in the magazine into the take-up chamber of the cartridge in which is contained a take-up spool. The variety of cameras available on the market having such cartridges can basically be reduced to two groups, viz. firstly, to cameras using cartridges which were loaded with the film by the dealer or manufacturer before sale and which are either designed for one single use or are reloaded by the dealer or manufacturer after having been returned for the purpose of development, and which, apart from the film and the spools that might be necessary, are provided with no other movable parts; and, secondly, to cameras in which cartridges are used which are supplied as a component of the camera and are furnished with various mechanisms such as exposure counter, means for regulating the film advance mechanism, locking device, etc., and a film in a cassette being inserted into said cartridge by the user before operating the camera.

Camera magazines of the first mentioned type are mainly used at present with so-called midget or sub-miniature cameras, since owing to their small dimensions it is difficult to manually insert a film into the camera and to fasten the film end to the take-up spool. Such magazines are, as a rule, of a very simple design and either produced of plastic material or thin sheet metal, the unexposed part of the film being stored in the film supply chamber in wound-up state without the use of a spool and the front end of the film being fastened to a take-up spool disposed in the film take-up chamber. That part of the film which is between the two chambers can be kept in a preselected position by the magazine itself, but it is mostly kept in the image plane of the camera by way of means provided by the camera. Such magazines are of sufficient sturdiness when used in midget cameras; for larger formats, however, they are unsuitable.

The expensive embodiments of magazines which, as a rule, are used in 35 mm. cameras or in cameras with still larger format are intended in general for being loaded by the user with usual film cassettes in exactly the same manner as is done with a usual camera. Since these magazines were primarily created for facilitating the exchange of partly exposed film in cameras of first quality, they are, as a rule, provided with means for precisely aligning the film in the exposure plane, furthermore which they are provided with movable cover blades or slides which in closed position protect the part of the film within the exposure plane from light, so that here the magazine can easily be exchanged without making it necessary to put up with the slightest loss of film. For achieving a plane position of the film within the magazine, the film is pressed against the magazine image aperture by a pressure plate connected with the magazine. Owing to the high costs incurred magazines of this kind have a small circle of customers.

It is the object of the invention to create a simple inexpensive magazine securing a plane position of the film when the magazine is inserted in the camera, and not having the disadvantages of the known magazines, i.e. lack of sturdiness on the one hand and high costs on the other. This object is accomplished according to the invention as regards the film magazine comprising a front part and a lid, preferably of plastic material, the front part forming a semicylinder closed at its ends as front wall of the film supply chamber and another semicylinder closed at its ends but open to receive the film spool and having inwardly projecting ribs for housing the exposed film, both semicylinders being connected by way of a front wall provided with an aperture, in that the lid closing the open side of the front part has an aperture allowing the pressure plate disposed at the camera rear wall or back, rear lid or cover to pass therethrough. Such a magazine has a sturdy construction and allows an easy exchange of films without making it necessary to rewind the film.

Further details of the invention may be taken from the description of two embodiments—without restriction thereto—as well as from the claims.

In the drawings which form a part of the disclosure of this invention:

Figure 1:
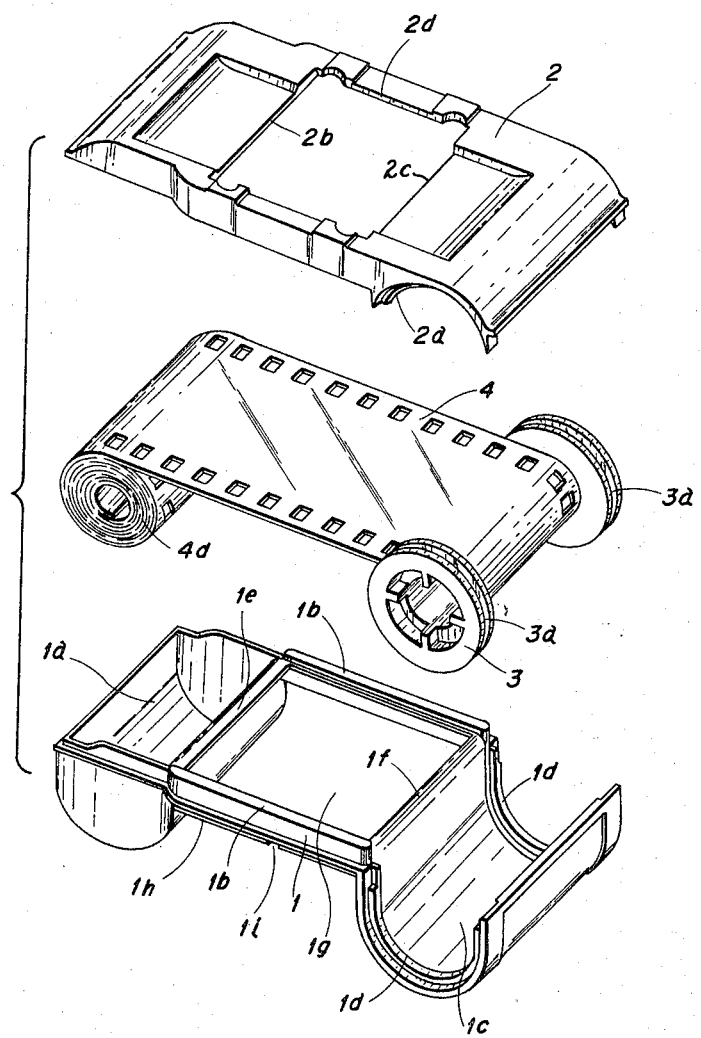
FIG. 1 is a perspective, exploded view of the film magazine provided with film without paper backing and having an aperture in the front part allowing a feeding of the film along the film guide in the camera.
Figure 2:
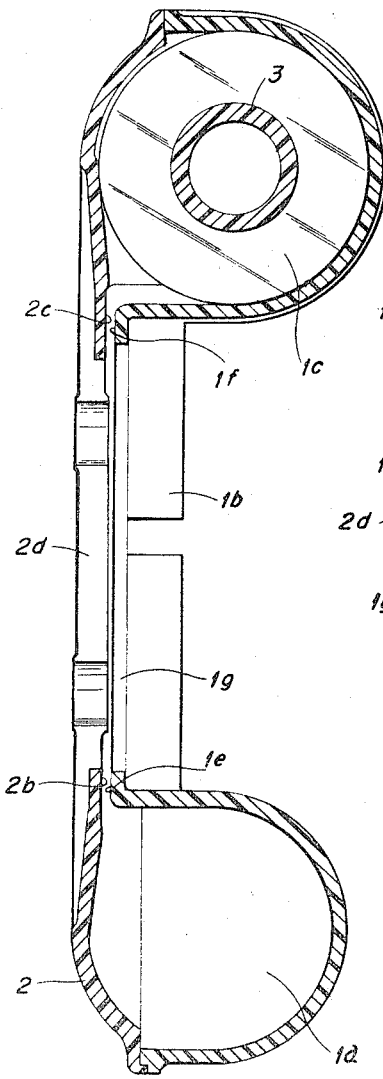
FIG. 2 is a sectional enlarged view of the film magazine according to FIG. 1, the film, however, is not shown.

The magazine shown in FIGS. 1 to 4 comprises the front part 1 and the lid 2 as well as spool 3 for receiving the exposed film 4. The film supply chamber 1a serves for housing the unexposed film portion 4a, preferably without spool, and has the shape of a semicylinder closed at the ends. Film supply chamber 1a is connected with film chamber 1c by members 1b which simultaneously form the front wall. Film chamber 1c serves for receiving spool 3 onto which the exposed film 4 is wound.

Ribs 1d at film chamber 1c and 2a at lid 2 engage with grooves 3a in spool 3 and enable a light-tight guide for the spool. The magazine is shaped both at the front part 1 and at the lid 2 in the area of the slot, which is formed by surfaces 1e and 2b and through which film 4 is drawn from the film supply chamber 1a, and in the area of the entrance slot to the film chamber, formed by surfaces 1f and 2c (FIGS. 1 and 2), in such a manner or is provided with such means that light is prevented from entering.

Figure 4:
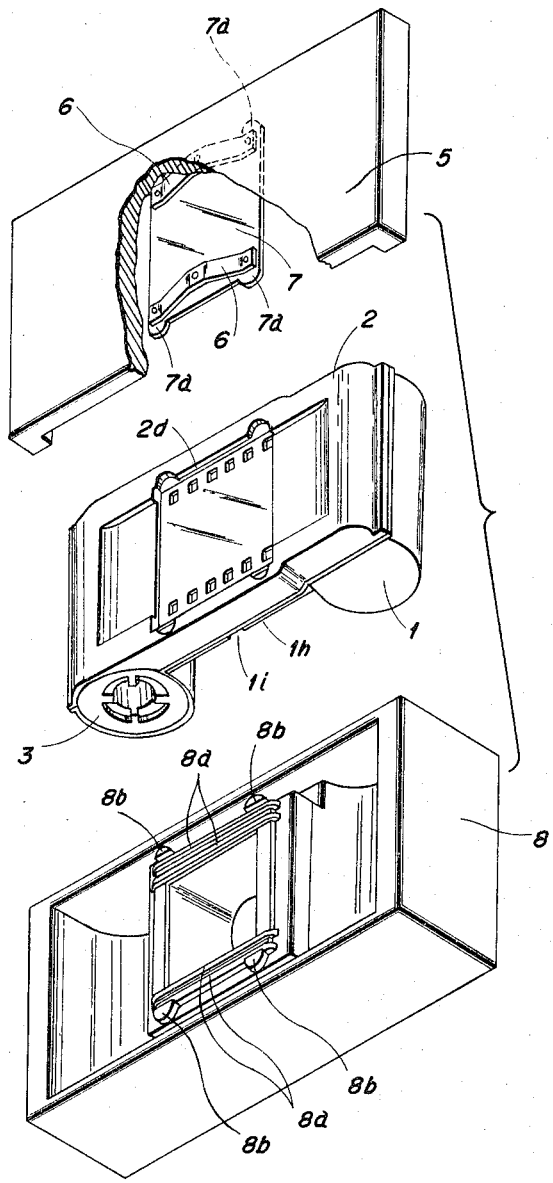
FIG. 4 is a perspective exploded view of the film magazine, according to FIGS. 1 to 3, and an opened camera.

Lid 2 is provided with an opening 2d enabling the pressure plate 7 shown in FIG. 4 and associated with the rear cover or lid 5 of the camera and forwardly biased by way of springs 6 to pass therethrough. The front wall formed by the angular webs 1b is provided with an aperture 1g. This makes it possible to directly place the emulsion side of the film 4 on the web-shaped film guide 8a formed by the camera main body portion or housing 8. When the camera lid 5 is closed, the projections 7a of rectangular-shaped pressure plate 7 rest on support surfaces or spots 8b which are slightly elevated compared to film guide 8a. The support surfaces also serve to guide the lateral edges of the film. In the channel formed between pressure plate 7 and film guide 8a the film 4 (possibly also with paper backing) is guided in a flat plane and with little friction.

Figure 3:
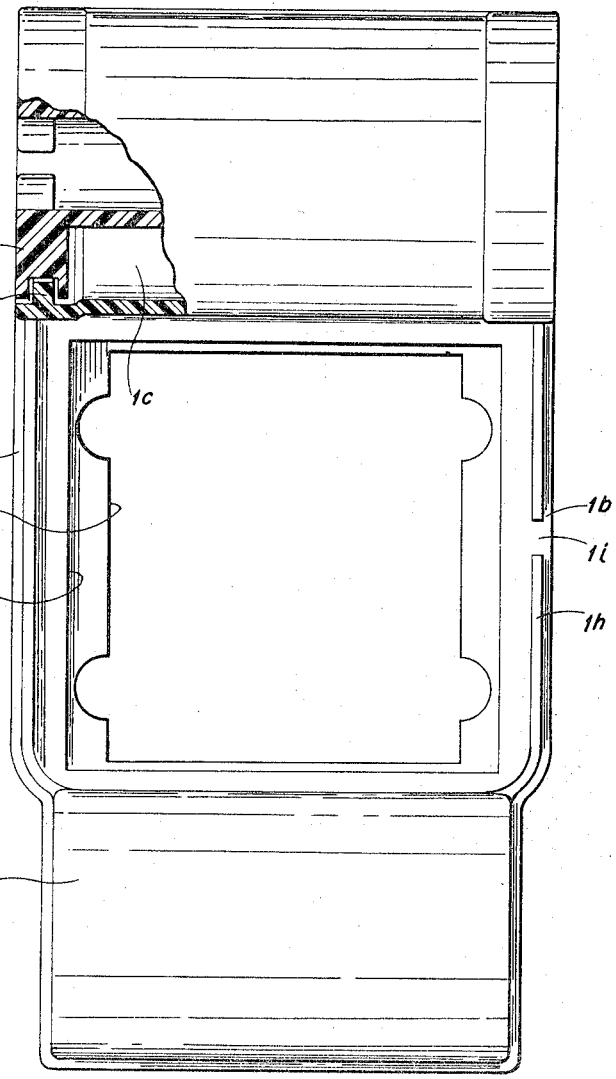
FIG. 3 is an enlarged view of that side of the film magazine, according to FIGS. 1 and 2, which faces the camera lens.
Figure 7:
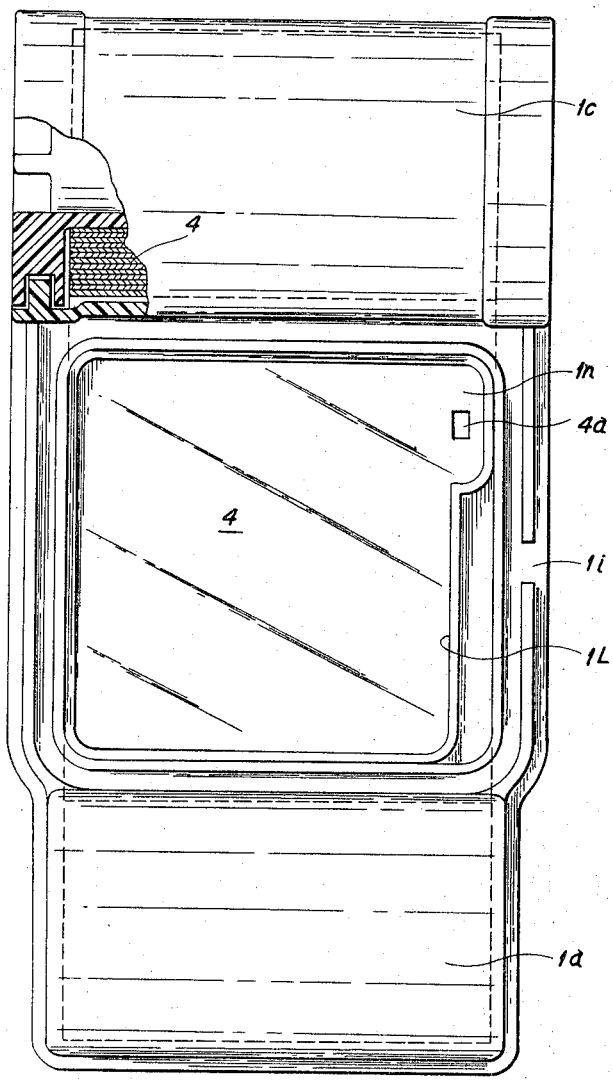
FIG. 7 is an enlarged view of that side of the film magazine which faces the camera lens according to FIGS 5 and 6.

As shown in FIGS. 3 and 7 in particular, the outer shape of the magazine is such (e.g. the diameter and length of the supply chamber 1a are smaller than those of film chamber 1c) so that the film magazine can be placed into the camera 8 only in such a way that the film 4 can be fed from the supply chamber 1a to the film chamber 1c when operating the film feed device. A rib 1h pertaining to the front wall of the magazine is provided with a recess 1i whose position along the rib depends on the speed of the film used. This recess 1i is scanned for consideration of the film speed by exposure control and/or setting members (not shown) disposed in the camera.

Figure 5:
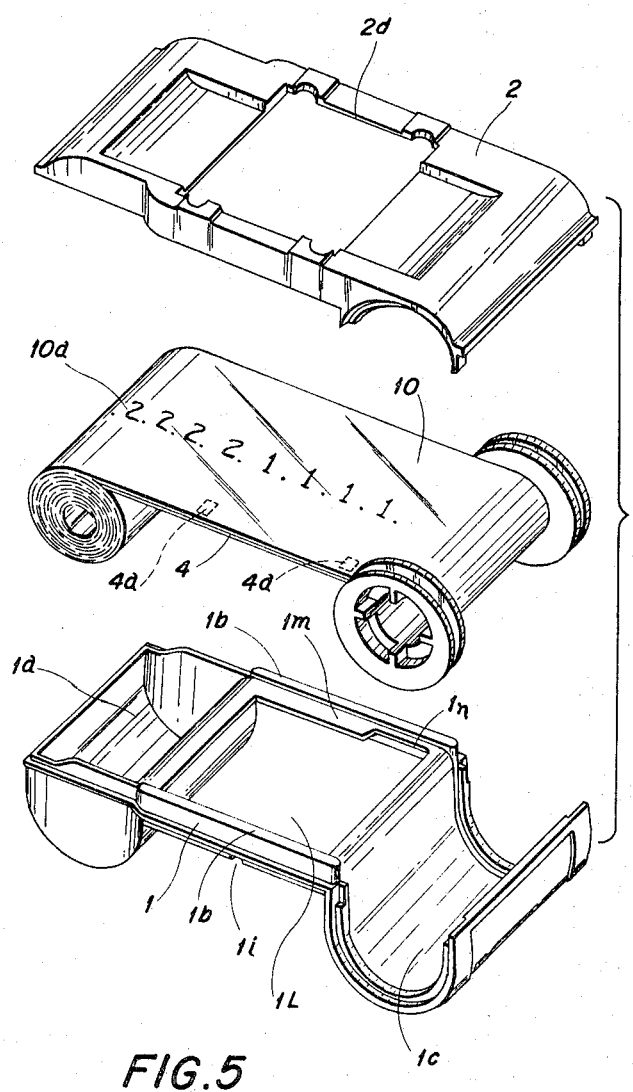
FIG. 5 is a perspective exploded view of the film magazine and of a film with paper backing, showing how the film in the camera is pressed against the inside front wall of the magazine by the pressure plate of the camera.
Figure 6:
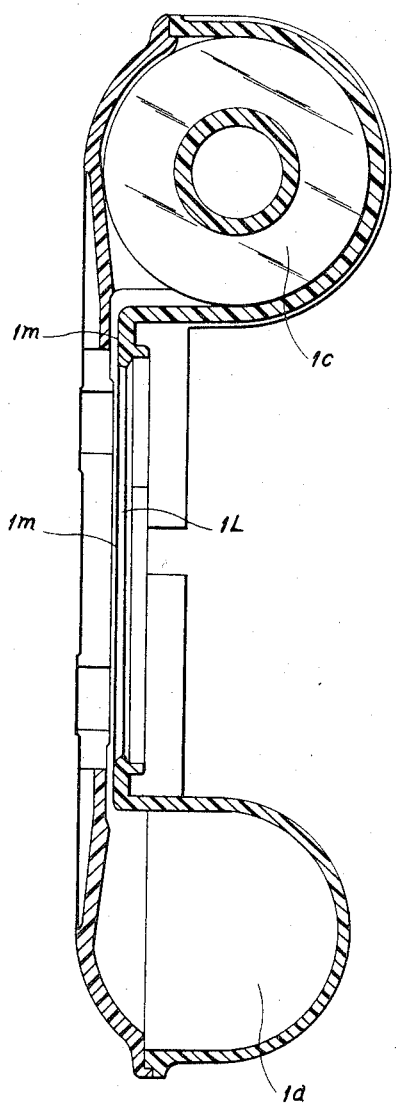
FIG. 6 is a sectional enlarged view of the film magazine according to FIG. 5 without film and paper backing.

The embodiment of the magazine in accordance with FIGS. 5 to 7 differs only slightly from the one shown in FIGS. 1 to 4. In this embodiment the film 4 is provided with a paper backing 10. The aperture 1L in the front wall of the film magazine front 1 serves at the same time as exposure aperture. Together with paper backing 10 the film is pressed against the interior 1m of the front wall formed by webs 1b by pressure plate 7 (FIG. 5) projecting through the opening 2d in lid 2. However, it is within the scope of the invention to design the interior 1m in such a way that the film 4 and the paper backing 10 is guided into a film channel in connection with the pressure plate 7 associated with the rear lid 5 of the camera 8. In both cases a flat plane position of film 4 in the area of the exposure aperture 1L is assured. Recess 1n allows a locking lever (not shown) terminating the film transport after each cocking operation to drop into locking perforation 4a provided in film 4. When the use of figures or numerals 10a for indication of the respective picture number is intended, the pressure plate 7 and the rear wall 5 of the camera is to be provided with a corresponding slot (not shown).

With all embodiments it is within the scope of the invention to feed the exposed film into the film chamber without spool and to provide resilient means (not shown) in the film magazine to assure a tight coil. Furthermore, the film can be taken up or guided, respectively, by spools, both in the film chamber for reception of the exposed film and in the supply chamber.

The invention has been described in detail with particular reference to preferred embodiments thereof, but it will be understood that variations and modifications can be effected within the spirit and scope of the invention as described hereinabove and as defined in the appended claims.

I claim:

1. A film magazine for use in a camera having a main body portion and an openable back, a forwardly biased pressure plate mounted on the inside of the back, and film guide means disposed in the main body portion adjacent the optical axis of the camera, said film magazine comprising:

a front part and a lid, said front part formed into a semicylinder closed at its ends which serves as the front wall of a film supply chamber and a semicylinder for receiving a film spool which serves as the front wall of a film chamber for housing exposed film, both semicylinders being connected by a front wall having an opening through which film may be exposed when drawn across from one chamber to the other;

said lid light-tightly closing the open side of said front part and having an opening large enough for said pressure plate of a camera to pass therethrough for engagement with the film in the area of the front wall opening of the film magazine when the latter is in operative position in the camera and the openable back is in closed position with the main body portion.

2. A film magazine as defined in claim 1 characterized in that the front wall opening of the magazine is of such size that the emulsion side of the film, when film is drawn across the opening, is urged by the pressure plate into engagement with said film guide means of a camera.

3. A film magazine as defined in claim 1 characterized in that the front wall has a rearwardly facing interior wall surface means bordering the front wall opening so that the emulsion side of the film, when film is drawn across the opening, is urged by the pressure plate into engagement with said interior wall surface means.

4. A film magazine as defined in claim 2 characterized in that a scroll of film is provided in the film supply chamber and a spool is provided in the film chamber, said scroll having a leader portion of the film extending from the supply chamber across the front wall opening and being connected to the spool in the film chamber.

5. A film magazine according to claim 2 characterized in that an indentation is provided in the forward surface of the front wall of the magazine adjacent said front wall opening, said indentation being located at a predetermined position along the front wall and indicative of a characteristic of the film contained in the film magazine.

6. A film magazine as defined in claim 2 characterized in that the outer diameter and length of one of the chambers of the magazine differ in size from the outer diameter and length of the other chamber in order to assure proper insertion of the film magazine into a camera.

7. A film magazine for use in a camera having a main body portion and an openable back, a forwardly biased pressure plate mounted on the inside of the back, and film guide means disposed in the main body portion adjacent the optical axis of the camera, said film magazine comprising:
a front part and a lid,
said front part formed into a semicylinder closed at its ends which serves as the front wall of a film supply chamber and a semicylinder which serves as the front wall of a film chamber for housing exposed film, both semicylinders being connected by a front wall having an opening through which film may be exposed when drawn thereacross from one chamber to the other;
said lid light-tightly closing the open side of said front part and having an opening large enough for said pressure plate of a camera to pass therethrough for engagement with the film in the film magazine when the latter is in operative position in the camera and the openable back is in closed position with the main body portion;
a scroll of film disposed in the film supply chamber and having a leader portion of the film extending from the supply chamber across the opening in the front wall and into the film chamber,
and means in the film magazine for moving the film from the film supply chamber to the film chamber across said front wall opening.

8. A camera for use with a film magazine comprising:
a main body portion;
an openable back connected to the main body portion;
a forwardly biased rectangular pressure plate mounted on the inside of said back and having projections at the corners of said plate;
film guide means disposed in the main body portion adjacent the optical axis of the camera;
and support surface means disposed in the main body portion adjacent said film guide means and extending a predetermined distance rearwardly of said film guide means for abutting cooperation with said projections for supporting the pressure plate in spaced relation to the film guide means when the back is in closed position with the main body portion.

9. A camera for use with a film magazine having a front part formed with semicylindrical chambers connected by a front wall in which an exposure opening is provided and further having a lid for light-tightly closing the open side of the front part, the lid being provided with an opening in alignment with and coextensive with said exposure opening, said camera comprising:
a main body portion;
an openable back connected to the main body portion;
a forwardly biased rectangular pressure plate mounted on the inside of said back and having projections at the corners of said rectangular plate;
film guide means disposed in the main body portion adjacent the optical axis of the camera;
support surface means disposed in the main body portion adjacent said film guide means and extending a predetermined distance rearwardly of said film guide means for abutting cooperation with said projections for supporting the pressure plate in spaced relation to the film guide means when the back is in closed position with the main body portion so that when the film magazine is loaded in the camera, the pressure plate will project through the opening in the lid and cause the film to be pressed into engagement with said film guide means whereby the spacing between the film guide means and the pressure plate as the plate is being supported by said support surface means forms a passageway for the film as the film is drawn across the exposure opening from one chamber to the other chamber.

10. In a camera, the combination comprising:
a film magazine provided with film and having a front wall formed into a pair of semicylindrical chambers spaced from each other, an opening in the front wall between the semicylindrical chambers for alignment with the optical axis of said camera for exposing said film when the latter is drawn across the opening from one chamber to the other chamber, and a lid for light-tightly closing the open side of the front wall and having an opening therein centrally located with respect to the opening in the front wall;
said camera having a main body portion with means for receiving said pair of semicylindrical chambers of said film magazine, film guide means and support surface means adjacent and projecting rearwardly of said film guide means, an openable back connected to said main body portion and having a spring-biased pressure plate mounted on the inside of the openable back for passing through the film magazine lid and front wall openings for abutting engagement with said support surface means to form a film passageway between the pressure plate and the film guide means and to insure a flat film plane when the bcak is in closed position with said main body portion.

11. In a camera, the combination comprising:
a film magazine provided with film and having a front wall formed into a pair of semicylindrical chambers spaced from each other, an opening in the front wall between the semicylindrical chambers for alignment with the optical axis of said camera for exposing said film when the latter is drawn across the opening from one chamber to the other chamber, rearwardly facing interior wall surface means bordering the front wall opening, and a lid for light-tightly closing the open side of the front wall and having an opening therein centrally located with respect to the opening in the front wall;
said camera having a main body portion with means for receiving said pair of semicylindrical chambers of said film magazine, an openable back connected to said main body portion and having a spring-biased pressure plate mounted on the inside of the openable back and passing through the film magazine lid opening for pressing the film into engagement with said rearwardly facing interior wall surface means and thus insure a flat film plane when the back is in closed position with the main body portion.

12. A film magazine for use in a camera having a main body portion and an openable back, a forwardly biased pressure plate mounted on the inside of the back, and film guide means disposed in the main body portion adjacent the optical axis of the camera, said film magazine comprising:

a front portion formed into a first semicylinder closed at its ends and serving as the front wall of a film supply chamber and into a second semicylinder for receiving a film spool and serving as the front wall of a film chamber for housing exposed film, said semicylinders being connected to each other by a front wall having an opening through which film can be exposed when drawn across from one chamber to the other; and a rear portion having an opening large enough for said pressure plate to pass therethrough and urge the film forwardly in the area of the front wall opening of the film magazine when the latter is in the camera with said camera back closed.

13. A film magazine for use in a camera having pressure plate means for urging the film in the magazine forwardly into an exposure position, said magazine comprising film supply and take-up chambers connected to each other by front and rear walls forming an enclosed passageway for the film, said front wall having an opening therein through which the film is exposed as it is advanced from said supply chamber to said take-up chamber, and said rear wall defining therein opening means in alignment with said front wall opening and large enough for said pressure plate means to pass therethrough and to urge the film forwardly in the area of the front wall opening of the film magazine when the latter is in the camera.

14. A film magazine according to claim 13 in which said front wall has a surface defining said exposure position of the film and against which surface the film is urged by said pressure plate.

15. A film magazine according to claim 13 in which said camera has a surface defining said exposure position of the film and against which surface the film is urged by said pressure plate.

References Cited

UNITED STATES PATENTS

| | | | |
|---|---|---|---|
| 2,378,406 | 6/1945 | Harris | 95—31 |
| 2,950,665 | 8/1960 | Meixner | 95—31 X |

OTHER REFERENCES

Schrader, German printed application, 1,083,116. Printed June 9, 1960 (Kl 57a 22/03), 95-31.

NORTON ANSHER, *Primary Examiner.*

JOSEPH F. PETERS, JR., *Assistant Examiner.*